United States Patent [19]

Kishimura et al.

[11] Patent Number: 4,993,010
[45] Date of Patent: Feb. 12, 1991

[54] LASER DISK CASSETTE SELECTING SYSTEM

[75] Inventors: Yuhei Kishimura; Osamu Nakajima, both of Tokyo; Takashi Miura, 3-2-306 Sakae-cho, Itabashi-ku Tokyo, all of Japan

[73] Assignees: Sysmic Co., Ltd.; Taco Co., Ltd.; Takashi Miura, all of Tokyo, Japan

[21] Appl. No.: 206,044

[22] Filed: Jun. 13, 1988

[30] Foreign Application Priority Data

Dec. 21, 1987 [JP] Japan ................. 62-192794

[51] Int. Cl.$^5$ .............................. G11B 17/00
[52] U.S. Cl. ...................... 369/36; 369/34; 369/38
[58] Field of Search .............. 369/36, 38, 39

[56] References Cited

U.S. PATENT DOCUMENTS

| | | |
|---|---|---|
| 4,170,030 | 10/1979 | Castrodale et al. ............ 369/38 |
| 4,502,133 | 2/1985 | Siryj et al. ............ 369/38 |
| 4,561,078 | 12/1985 | Nakayama ............ 369/38 |
| 4,788,673 | 11/1988 | Ikeda et al. ............ 369/36 |
| 4,796,244 | 1/1989 | Tsuruta et al. ............ 369/38 |

Primary Examiner—Stuart S. Levy
Assistant Examiner—Kenneth B. Wells
Attorney, Agent, or Firm—Cislo & Thomas

[57] ABSTRACT

A laser disk cassette selecting system comprising a cassette case having a plurality of housing cavities in a multi-layered or sequential form for housing laser disks or cassettes, a cassette or disk case holding member for detachably mounting the case, a driving motor for moving the case holding member up or down, a forwarding device which forwards a selected laser disk or cassette in the case into a disk or cassette player, whereby the laser disk or cassette is selectively forwarded into the disk or cassette player after a certain positioning operation occurs to orient the selected disk or cassette with the player.

6 Claims, 4 Drawing Sheets

LASER DISK CASSETTE SELECTING SYSTEM

BACKGROUND OF THE INVENTION

The application for patent is based on a Japanese patent application No. 62-192794/1987 filed on Dec. 21, 1987.

This invention relates to a laser disk cassette selecting system, particularly one to move up and down a cassette case holding a plurality of stacked laser disks, to select a desired laser disk, and to transport it to a disk player system.

In the conventional type of laser disk player system, one laser disk is sequentially sent to a laser disk player system by a manual operation. To change the laser disk requires taking out a laser disk already played within the laser disk player by hand, and placing a new laser disk by hand within the laser disk player.

SUMMARY OF THE INVENTION

It is an object of the present invention to provide a laser disk or cassette selecting system for selecting a particular laser disk or cassette from many disks or cassettes within a case and transporting it to a laser disk or cassette player. The system moves the case holding many laser disks or cassettes in a stacked or sequential condition up or down, orients a particular laser disk or cassette with the player and inserts the cassette.

DESCRIPTION OF THE PREFERRED EMBODIMENT

Figure 1:
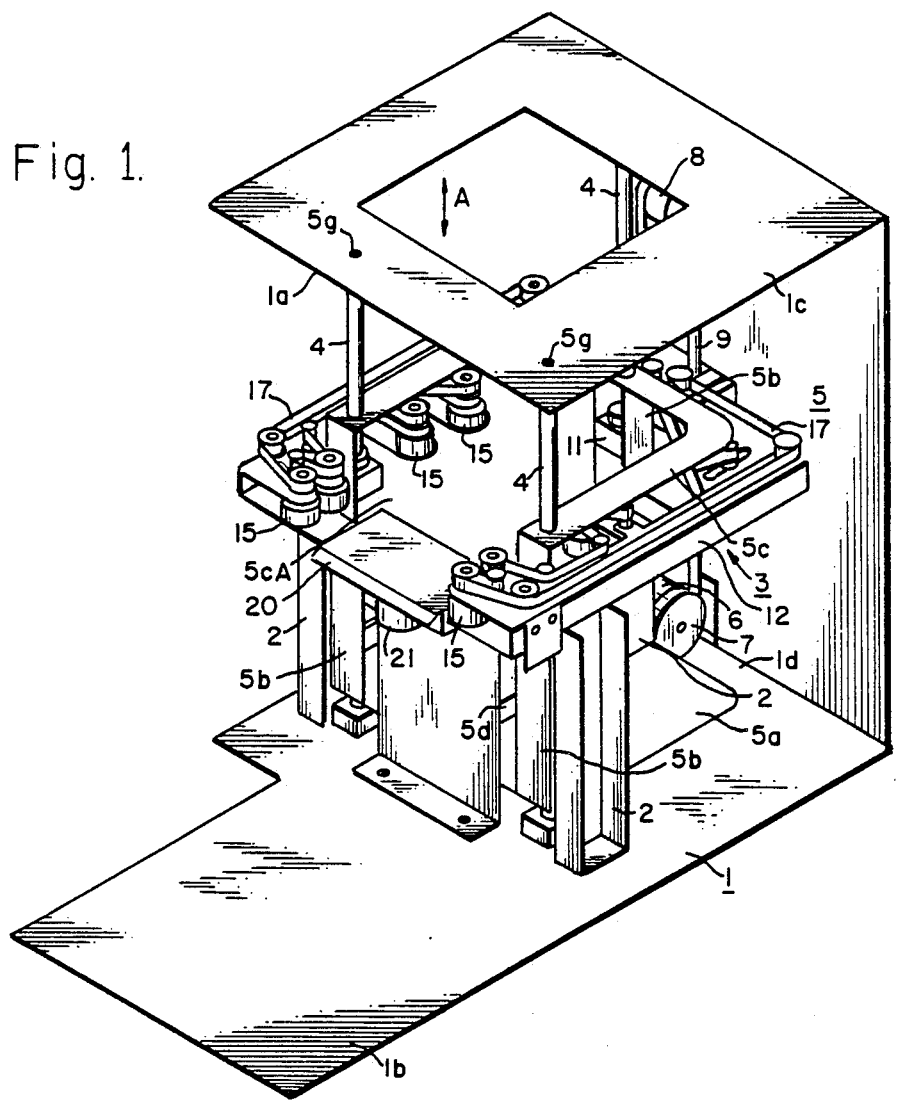
FIG. 1 shows a right perspective view of a laser disk cassette selecting system of the present invention excluding a cassette case and without side walls for purposes of illustration.

Reference is now made to the accompanying drawings showing a preferred embodiment of the present invention. As shown in FIG. 1, numeral 1 is a casing having a box shape in which one side thereof is eliminated. Side walls of the casing 1 are not shown for purposes of illustration. A connecting base plate 1b for connecting the embodiment to a disk player (not shown) is formed at an opened side 1a of the casing. The disk player is connected to the connecting base plate 1b.

A disk cassette transporting or forwarding means 3 is formed having a square shape acting as a frame which is stationarily mounted on poles 2 which are mounted to the casing 1. Three supporting poles 4 are fixedly mounted on the casing 1 extending through the disk cassette forwarding means 3. The upper portions of the supporting poles 4 and an upper plate 1c of the casing 1 are fixedly connected by bolts 5g.

A cassette case holding member 5 is slideably mounted along the supporting poles 4 allowing the cassette case holding member 5 to move up and down.

Figure 4:
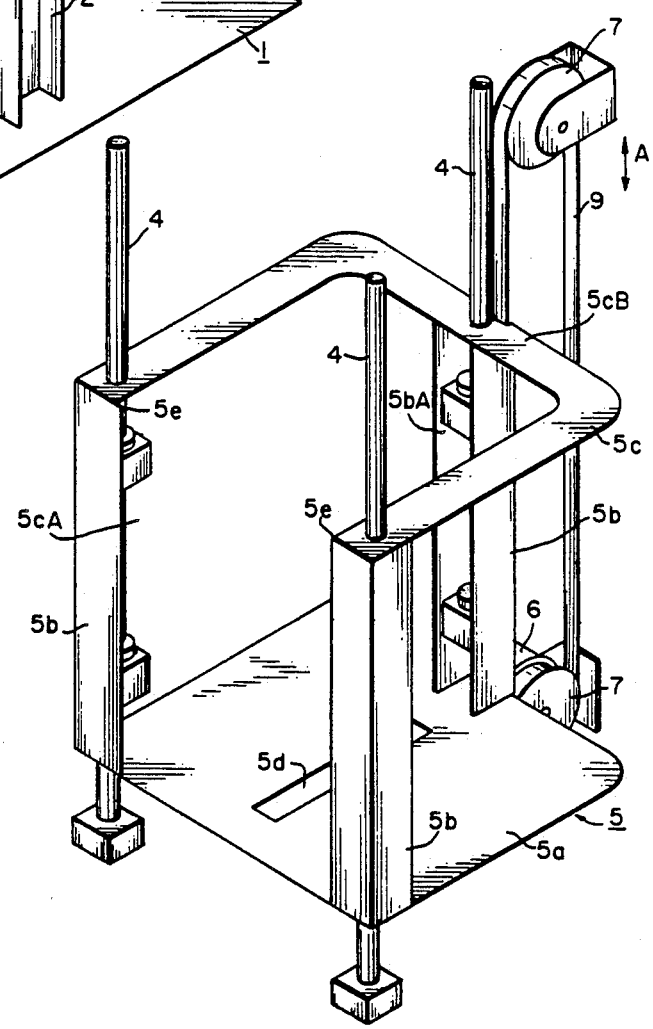
FIG. 4 shows a right perspective view of a portion of the laser disk cassette selecting system of the present invention, excluding the disk cassette forwarding means shown in FIG. 2.

As shown in FIG. 4, the cassette case holding member 5 is comprised of a bottom plate 5a, movable poles 5b and an upper frame 5c. A guide hole 5d or slot is formed in the bottom plate 5a. A front side 5cA of the upper frame 5c is open.

As best shown in FIG. 4, one of the movable poles 5b is located at a rear side 5cB of the upper frame 5c and has a channel portion 5bA which acts as a guide means.

As shown in FIG. 1, an ascent and descent motor 6 for upwardly and downwardly moving the cassette case holding member 5 in the direction shown by the arrow marked A is positioned at a rear side 1d of the casing 1. A belt 9 is mounted between a pulley 7 attached to the motor 6 and a pulley 8 attached to the casing 1. The belt 9 is connected with the cassette case holding member 5. The cassette case holding member 5 moves upwardly and downwardly in relation to the movement of the belt 9.

The driving means of the belt 9 and the cassette case holding member 5 shown in this embodiment is not limited to the motor 6. A combination of a stepping motor and a rack and pinion may be used instead of the motor 6.

Figure 5:
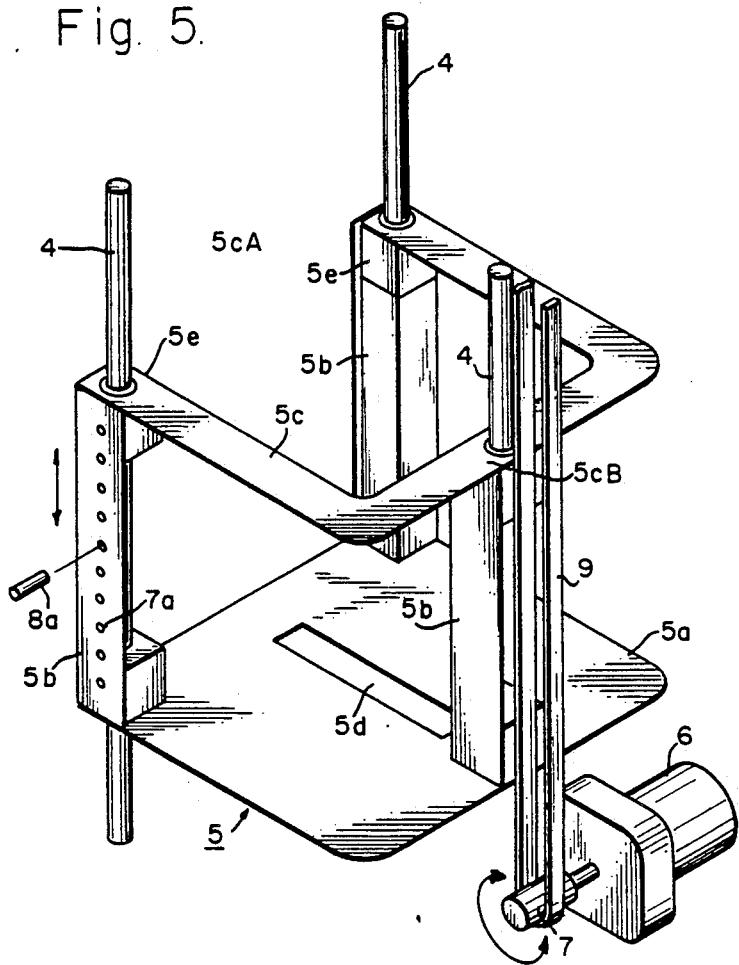
FIG. 5 shows a rear left perspective view of a portion of the laser disk cassette selecting system of the present invention, excluding the disk cassette forwarding means shown in FIG. 2.

The positioning operation of ascent and descent of the cassette case holding member 5 is performed by a plurality of positioning holes 7a as shown in FIG. 5 which are formed within one of the movable poles 5b. A plunger means 8a is mounted to one of the poles 5b within one of the positioning holes 7a. The positioning holes 7a correspond to a positioning state which indicates an ascent or descent condition of the cassette case holding member 5 which is detected by a micro switch (not shown). The micro switch detects a position corresponding to the positioning holes 7a, whereby an ON or OFF condition of the motor 6 is controlled. Such a micro switch is known to persons ordinarily skilled in the art of control systems for electromechanical devices.

Figure 2:
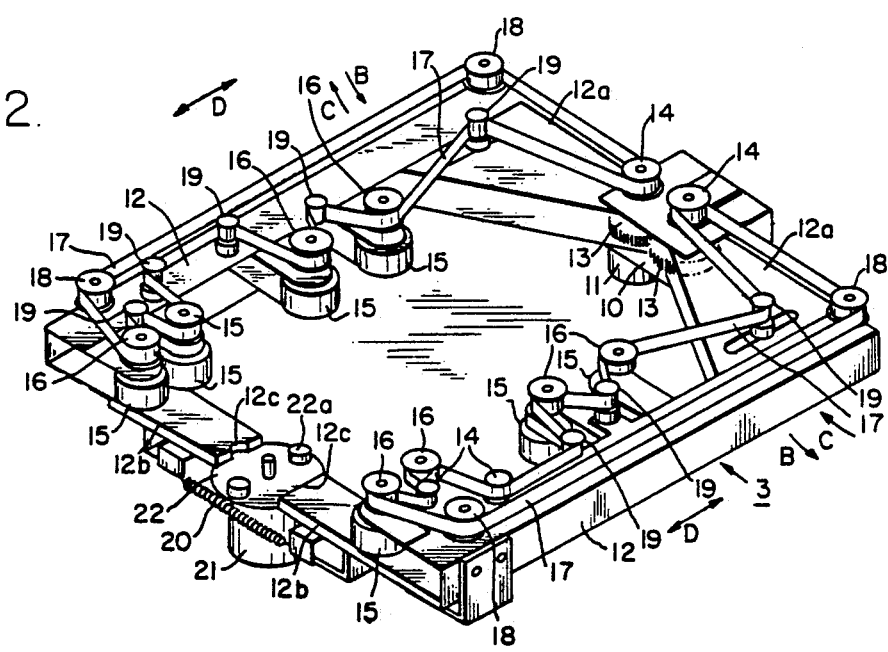
FIG. 2 shows an enlarged right perspective view of a disk cassette forwarding means of the present invention.
Figure 3:
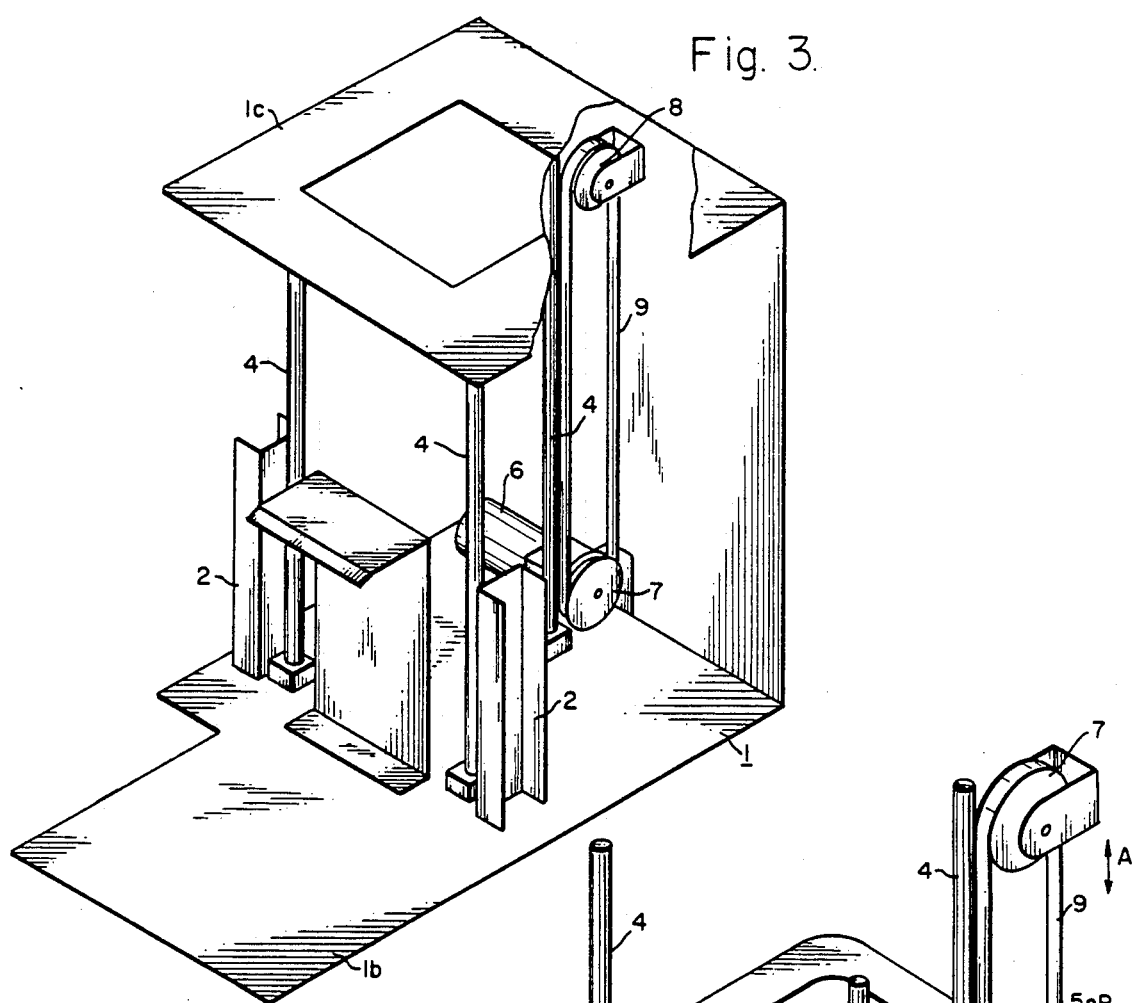
FIG. 3 shows a right perspective view of a portion of the laser disk cassette selecting system of the present invention with an upper portion shown cutaway for clarity.

Further, FIG. 2 shows the disk cassette forwarding means 3 in which a driving motor 11 is mounted to a base member 10. A pair of arms 12 are rotatably mounted so as to rotate according to arrows marked B and C in a closed and open condition, respectively.

A pair of gears 13 are mounted to base portions 12a of the arms 12 and are geared to each other. The gears 13 are rotated by the driving motor 11 which effectively rotates both gears 13. A pair of pulleys 14 are connected to the gears 13. A plurality of forwarding pulleys 16 mounted on the arms 12 operatively engage forwarding rollers 15 also mounted upon the arms 12.

The forwarding rollers 15 are wholly driven by two loop belts 17 which are mounted upon the pulleys 14, respectively. Each of the forwarding rollers 15 can be rotated in the directions marked by the arrow D. Each of the loop belts 17 are simultaneously engaged by a plurality of pulleys 18 and tension pulleys 19 so as to properly direct rotational movement from the driving motor 11 to the forwarding rollers 15.

A front portion 12b of each of the arms 12 are pulled together inwardly by a spring 20. A cam member 22 having a pair of cam portions 22a acts as an opening and closing member which is rotated by a motor 21 positioned between the front portions 12b. When the cam member 22 is rotated and the cam portions 22a contact portions 12c of the front portions 12b, each of arms 12 open outwardly, whereby a distance between the forwarding rollers 15 is created.

Figure 6:
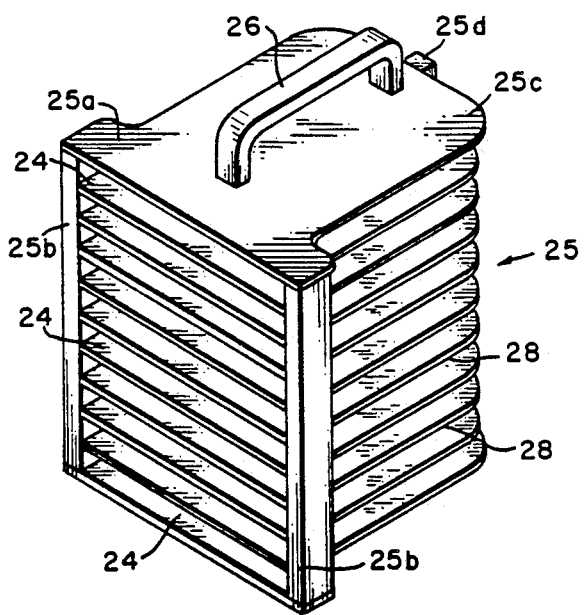
FIG. 6 shows a right perspective view of a cassette case of the present invention.
Figure 7:
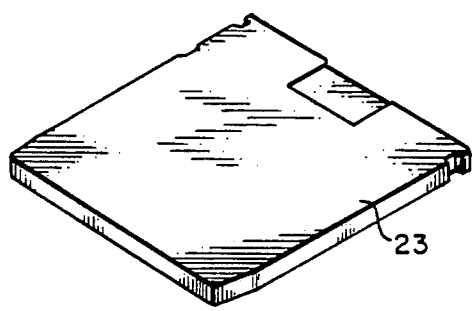
FIG. 7 shows a right perspective view of a laser disk cassette used in the present invention.
Figure 8:
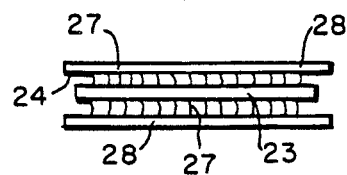
FIG. 8 shows a front plan view of a portion of the cassette case shown in FIG. 6.

Further, FIG. 6 shows a cassette case 25 having a plurality of housing cavities 24 for housing a plurality of laser disk cassettes 23 in a multi-level or stacked condition. The cassette case 25 is constructed so as to be detachably mounted within the cassette case holding member 5 of FIG. 5.

A pair of front vertical guides 25b of the cassette case 25 are guided by guide portions 5e of the cassette case holding member 5 as shown in FIG. 4. A rear vertical guide 25d which is formed at portion 25c of the cassette case 25 is guided by one of the movable poles 5b positioned by the rear side 5cB of the cassette case holding member 5.

Figure 9:
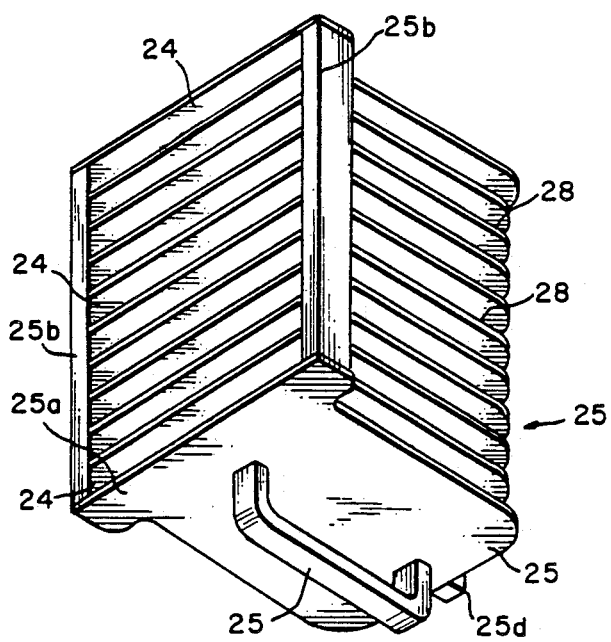
FIG. 9 shows a bottom perspective view of the laser cassette shown in FIG. 6.

A pair of handles 26 (only one of the handles can be seen in FIG. 6) are formed at both ends of the cassette case 25. The handles 26 extend a predetermined distance away from the cassette case. One of the handles 26 (not shown in FIG. 9) is guided and positioned into a guide hole 5d within the cassette case holding member 5 when the cassette case 25 is lowered into the cassette case holding member 5. The cassette case 25 can be easily handled by preferably grasping one of the handles 26.

The housing cavities 24 of the cassette case 25 are separated by separating plates 28 each having a coarse portion 27 which may comprise hair, bristles or the like for obtaining frictional contact against laser disk cassettes 23 when the laser disk cassettes 23 are inserted into the housing cavities 24, respectively. The coarse portion 27 must be of a material so as not to damage the surface of the laser disk cassette 23 upon insertion, engage the cassette 23 and allow the cassettes to be pushed out upon insertion. Slippage of the laser disk cassettes 23 from the housing cavities 24 is reduced while transporting the cassette case 25 after detachment from the cassette case holding member 5.

Below is a discussion of the operation of the present invention.

Referring to FIG. 2, the arms 12 of the cassette forwarding means 3 may be opened by rotating the cam member 22 by operation of the motor 21. The cassette case 25 is mounted within the cassette case holding member 5 after a plurality of laser disk cassettes 23 have been placed into the cassette case 25. When the arms 12 are open, the cassette forwarding means 3 allows the cassette case 25 to move up and down.

The motor 6 is driven according to a predetermined control signal from a control circuit (not shown), whereby the cassette case holding member 5 is moved upwardly or downwardly, respectively. It should be recognized by those ordinarily skilled in the art that the control circuit and control signals necessary for proper operation are of the kind used in many common electromechanical apparatuses.

The location of a desired laser disk cassette 23 can be detected by the micro switch (not shown) as the cassette case holding member 5 moves upward or downward. When the selected location is found the motor is stopped by the regular functioning of the control circuit. Then, the cam member 22 is rotated by the motor 21, whereby the pair of cam portions 22a of the cam member 22 are repositioned to a closed condition with respect to contact portions 12c. Cam portions 22a and contact portions 12c are not in contact. The arms 12 are moved to a closed position as shown in FIG. 1 and FIG. 2 and clasp the laser cassette 23 to be inserted into the cassette player.

A positioning operation of the cassette case holding member 5 is performed using the plunger 8a to insure proper orientation of the cassette case holding member 5 with respect to the cassette player. This feature allows the invention to be used with cassette players having varying heights.

Each of the forwarding rollers 15 can be rotated in the directions marked by the arrow D using the gears 13, the pulleys 14, the forwarding pulleys 16 and the belts 17 when the motor 11 is driven. A selected laser disk cassette 23 is forwarded into a laser disk player.

During the cassette case holding member's 5 up and down movement together with the cassette case 25 and disk cassettes 23, the cam portions 22a of the cam member 22 are in contact with the contact portions 12c due to the operation of the motor 21, whereby the arms 12 are opened outwardly. The forwarding rollers 15 are positioned so as not to obstruct upward and downward movement of the cassette case holding member 5.

According to the present invention, the embodiment herein described is able to selectively forward a chosen laser disk cassette from many laser disk cassettes housed within the cassette case.

An increased amount of memory capacity is afforded many application using many laser disks which is preferable for a memory system like the Patent Office to bring about a paperless system.

It is preferable to house laser disk cassettes in housing cavities of a cassette case using a coarse portion such as hair, bristles or the like as a frictional means to engage the laser disks.

The inventor is able to handle and mount a cassette case within a cassette case holding member using a pair of handles, thereby enabling the ease of handling and transporting the cassette case by using either of the handles thereof.

Although the present invention has been described in detail with reference only to the presently-preferred embodiment, it will be appreciated by those of ordinary skill in the art that various modification can be made without departing from the invention. Specifically, the invention has only been shown in use with laser disk cassettes. However, laser disks, audio cassettes, video cassettes, and other forms of media may have similar application with respect to the present invention. Accordingly, the invention is limited only by the following claims.

We claim:

1. A laser disk cassette forwarding means for inserting and retracting a laser disk or cassette into or from a laser disk player comprising:
   first and second arms having a first plurality of rollers;
   a first band operatively connected to and engaging said first plurality of rollers;

a motor which operatively drives said band to turn said first plurality of rollers in a desired direction; and means for creating an open or closed condition between said arms allowing the cassette to be engaged or disengaged by said rollers, respectively;

a first plurality of pulleys associated with said forwarding rollers and said motor to allow said motor to engage said band and thus engage said forwarding rollers;

wherein said arms pivotally rotate relative to each other, and the forwarding means further comprises a second plurality of pulleys, a second band engaging said second plurality of pulleys, and a second plurality of rollers engaging said second plurality of pulleys located upon said second arm and driven by said second band, and wherein said first plurality of rollers engaging said first plurality of pulleys are located on said first arm and driven by said first band engaging said first plurality of pulleys, allowing said first and second plurality of forwarding rollers to be driven in complementary directions to engage the laser disk or cassette and selectively retract or eject the laser disk or cassette, respectively;

wherein said means for creating an open or closed condition includes (a) a spring between said arms creating a tension pulling said arms together;

(b) a motor; and (c) a cam which can be rotated by said motor to spread apart said arms against said tension of said spring to create an open condition allowing movement of the forwarding means within a selecting system, and thereby disengaging said forwarding rollers from the laser disk or cassette, wherein said cam can be rotated to allow said spring to pull said arms together creating a closed condition to engage said forwarding rollers against the laser disk or cassette, thereby forwarding the laser disk or cassette into or out of said selecting system, respectively.

2. The laser disk cassette forwarding means of claim 1, further comprising tension pulleys located along said arms to maintain tension between said bands and said pulleys.

3. A cassette selecting system for selecting a cassette from a plurality of cassettes within a cassette case and inserting the selected cassette into a cassette player system comprising:

a cassette case holding member for detachably receiving the cassette case within;

an operatively associated driving means for moving the cassette case holding member to a position aligning the selected cassette with the cassette player system to allow insertion therein;

a cassette forwarding means positioned adjacent said cassette player holding member and oriented with the cassette player system so that said forwarding means selectively inserts the selected cassette into the cassette player system after the positioning operation is completed orienting said selected cassette within the cassette case with the cassette player system;

wherein said cassette case comprises a plurality of housing cavities for receiving the plurality of cassettes within the cassette case, with each said housing cavity further having a coarse portion with a coefficient of friction sufficient to keep a cassette positively held within the housing cavity;

wherein said cassette case has an upper endplate with a first handle attached thereto and a lower endplate with a second handle attached thereto, and wherein said guide hole is formed in a bottom face of said cassette case holding member, wherein one of said handles is positioned into said guide hole for positioning said cassette case in said cassette case holding member;

wherein said cassette case forwarding means forwards a selected laser disk cassette from a plurality of laser disk cassettes;

wherein said cassette forwarding means further comprises a pair of arms which are closed and opened by a cam member, a plurality of forwarding rollers which are rotatably mounted to said arms, and a pair of loop belts mounted upon said arms respectively for simultaneously rotating said forwarding rollers to engage the selected cassette to be inserted into or retracted from the cassette player;

wherein said forwarding means comprises the cassette forwarding means of claim 1.

4. A laser disk cassette selecting system for selecting a laser disk cassette from a plurality of laser disk cassettes and inserting the cassette into a disk player system comprising in combination:

a cassette case having a plurality of housing cavities for housing the plurality of laser disk cassettes;

a cassette case holding member for detachably mounting said cassette case upon;

a driving means for moving said cassette case holding member;

a disk cassette forwarding means positioned adjacent said cassette case holding member for forwarding the selected laser disk cassette from said cassette case to the disk player, wherein the selected disk cassette is forwarded into the disk player after a positioning operation is completed to orient said cassette case with the disk player;

wherein said cassette forwarding means includes first and second arms having a first plurality of rollers, a first band operatively connected to and engaging said plurality of rollers, a motor which operatively drives said first band to turn said first plurality of rollers in the desired direction, means for executing an open or closed condition between said arms allowing the cassette to be engaged or disengaged by said rollers respectively, a first plurality of pulleys associated with said forwarding rollers and said motor to allow said motor to engage said band and thus engage said forwarding rollers, with said arms pivotally rotating relative to each other, a second plurality of pulleys, a second band engaging said second plurality of pulleys, a second plurality of rollers engaging said second plurality of pulleys located upon said second arm and driven by said second band, a spring between said arms generating a tension pulling said arms together, a cam rotatable by said motor to spread apart said arms against said tension of said spring to execute an open condition allowing movement of the forwarding means within a selecting system, and thereby disengaging said forwarding rollers from the laser disk or cassette, and tension pulleys located along said arms to maintain tension between said bands and said tension pulleys, whereby said first plurality of rollers engaging said first plurality of pulleys are located on said first arm and driven by said first band engaging said first plurality of pulleys allowing said first and second plurality of forwarding rollers to be driven in complementary directions to engage the laser disk or cassette and selectively retract or eject the laser disk or cassette respectively.

5. A laser disk cassette selecting system as claimed in claim 4, wherein said housing cavities include a coarse portion creating friction, keeping the laser disk cassettes positively held within each of said housing cavities.

6. A laser disk cassette selecting system as claimed in claim 5, wherein said cassette case has an upper endplate with a first handle attached thereto and a lower endplate with a second handle attached thereto, and wherein a guide hole is formed in a bottom face of said cassette case holding member, wherein one of said first and second handles is positioned into said guide hole for positioning said cassette case in said cassette case holding member.

* * * * *